No. 829,644. PATENTED AUG. 28, 1906.
B. H. GLOVER.
WALL OR SWITCH BOX.
APPLICATION FILED AUG. 28, 1903.
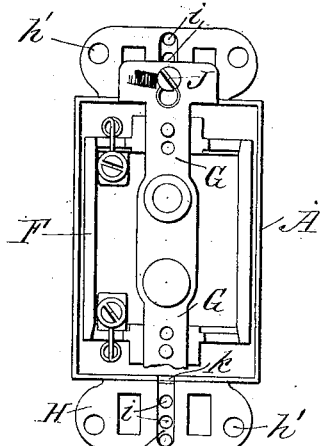
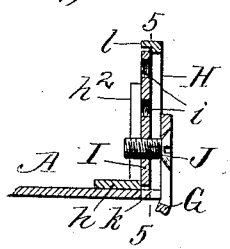
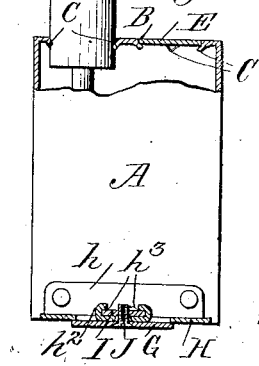
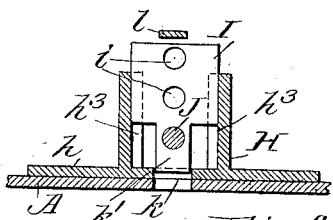
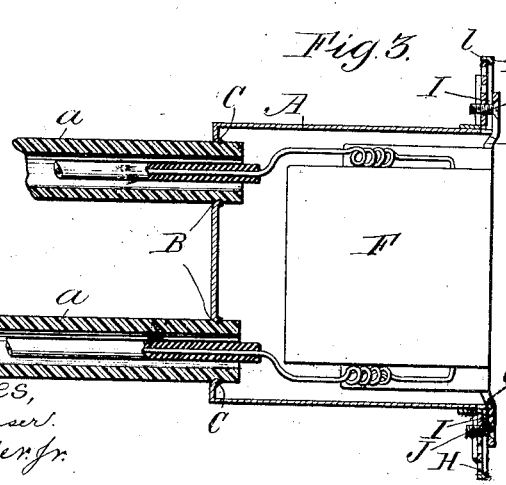
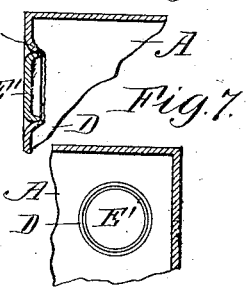
B. H. Glover
Inventor
Witnesses,
R. W. Rumser
J. N. Snyder Jr.
By Wilhelm Bonner
Attorneys

UNITED STATES PATENT OFFICE.

BENJAMIN H. GLOVER, OF BUFFALO, NEW YORK, ASSIGNOR TO CHICAGO FUSE WIRE AND MANUFACTURING COMPANY, OF CHICAGO, ILLINOIS.

WALL OR SWITCH BOX

No. 829,644.　　　Specification of Letters Patent.　　　Patented Aug. 28, 1906.

Application filed August 28, 1903. Serial No. 171,093.

*To all whom it may concern:*

Be it known that I, BENJAMIN H. GLOVER, a citizen of the United States, residing at Buffalo, in the county of Erie and State of New York, have invented new and useful Improvements in Wall or Switch Boxes, of which the following is a specification.

This invention relates to metal wall or switch boxes of that kind which are located in the walls of buildings or elsewhere and contain electrical switches or other appliances connected to electric conductors entering the boxes through conduits which are connected to the boxes.

The box is made of metal, preferably sheet metal of a suitable size and form to properly house the switch or other appliance, and is provided with a plurality of openings to receive the ends of the conduits for the electrical conductors which enter the box. The boxes are supplied to the trade with all of the conduit-openings stopped or closed by metal disks or plates, which are detachably retained in the conduit-openings in such a manner that one or more of them can be readily forced or knocked out, thus enabling the insertion of the desired number of conduits with their conductors and leaving the remainder of the closures or disks in place.

One object of the invention is to provide boxes of this character with exceedingly simple and inexpensive means for securely holding the conduits in their openings.

Another object of the invention is to provide the box with adjustable securing devices of simple and practical construction whereby the box is adapted to switches or appliances of different makes or which are not of uniform size or shape.

In the accompanying drawings, Figure 1 is a front elevation of a wall or switch box embodying the invention, one of the securing-arms for the switch-block being broken away. Fig. 2 is a plan view thereof, showing a portion of the box and one of the securing devices in section. Fig. 3 is a vertical longitudinal section through the box and securing devices, showing the switch-block in elevation. Fig. 4 is a longitudinal section, on an enlarged scale, of one of the securing devices for the switch-block. Fig. 5 is a transverse sectional elevation, on an enlarged scale, through the securing device in line 5 5, Fig. 4. Fig. 6 is a detail section showing one of the conduit-openings provided with a somewhat different holding means for the conduit and disk for closing said opening. Fig. 7 is a sectional elevation showing the opening and closing disk shown in Fig. 6.

Like letters of reference refer to like parts in the several figures.

A represents the wall or switch box, which is constructed in any suitable manner and shape, preferably of sheet metal.

The box shown in the drawings is rectangular and has an open front and is provided with a plurality of conduit-openings B, which are round or of substantially the shape and size of the cross-section of the conduit which is used, so that when in place the conduit *a* fills and closes the opening. One or more of the openings may be provided, and they can be located in the rear wall of the box, as shown, or in either or all of the other walls, as found necessary or expedient. Surrounding each conduit-opening the box is provided with one or more holding prongs, teeth, or portions which sink into or enter the surface of the conduit to a greater or less extent when the latter is inserted into the opening and hold the conduit securely in the opening. In Figs. 2 and 3 each hole is shown as provided with a plurality of spaced sharp or pointed teeth, prongs, or barbs C, which project inwardly or into the box from the surface of the wall of the box and also inwardly or centrally with respect to the opening. The teeth, prongs, or barbs are preferably integral unsevered portions of the wall of the box left by the die or punch in making the opening. On account of their inward deflection the teeth or prongs do not interfere materially with the easy introduction of the conduit into this opening; but they dig into or take hold of the conduit in such a manner as to require considerable force to pull the same out of the opening after once inserted.

In the construction shown in Figs. 6 and 7 the conduit-opening is provided with a continuous surrounding inwardly-projecting flange or fin D, which preferably has a ragged or uneven thin edge capable of sinking into and taking a firm hold on the conduit. The flange or fin is conveniently produced in punching the opening by employing a female die having a rounded edge, so that the metal of the wall surrounding the opening is drawn up and forms the flange or fin.

The disks or plugs E, which close the conduit-openings, are forced or pressed into the openings and are expanded slightly, if necessary, to retain them against unintentional displacement; but they can be readily knocked out of the openings by a blow from a hammer or suitable tool. The separated teeth or prongs are so formed that the circular edge of the openings at the outer face of the wall is practically continuous or unbroken, and the disk when in place makes a tight closure. The teeth or prongs assist, more or less, in retaining the disk in place. When the openings are made with the continuous holding-flange above described, the piece of metal punched out can be employed as the removable closure or disk E' for the opening.

The switch or other electrical appliance is usually carried by a block or case F, of porcelain or other insulating material, which, with the switch or appliance in place, is made and sold independently of the wall or switchbox to be removably secured therein. The means for securing the switch-block in the box is constructed as follows: G represents metal securing arms or plates which project from opposite sides of the block beside two attaching-lugs H, secured to and projecting from two opposite or the upper and lower walls of the box at the front thereof. Each attaching-lug is preferably formed of sheet metal and is provided with a portion $h$, which is bent at right angles to the body portion of the bracket and is riveted or otherwise secured to the wall of the box. The lugs are provided with holes $h'$ for attaching screws or devices. (Not shown.) Portions $h^2$ of the lug are stamped out of the body thereof and bent back and toward each other to form parallel guide-grooves $h^3$. (See Fig. 2.)

I represents adjustable slides or nuts which are confined in and movable toward and from the box in the guides on the lugs. Each nut or slide is preferably provided with a plurality of screw-threaded holes $i$.

J indicates screws which are inserted through slots in the securing-arms G and lugs H and screwed into one of the holes in each of the nuts or slides. By tightening up the screws the nuts or slides and the securing-arms on the switch-block are clamped tightly against the opposite sides of the attaching-lugs, thereby securely holding the block and switch or electrical appliance carried thereby in place. In switches of different makes the holes for the securing-screws J are not always located in exactly the same relation or spaced the same distance apart; but each of the adjustable nuts or slides can be moved to bring one of its threaded holes directly opposite to the screw-hole in the securing-arm.

In order to afford a considerable range of adjustment, the wall of the box and the securing portion of the lug are preferably slotted at $k$, Figs. 3, 4, and 5, and the adjustable nuts or slides are provided with reduced portions or extensions $k'$, which are adapted to enter said notches in the box and lugs. The adjustable nuts or slides are held from detachment from their brackets by stop projections $l$ at the outer ends of the lugs, which extend into the path of the nuts or slides.

I claim as my invention—

1. A box having one or more openings in its walls to receive a conduit or conduits, the wall of the box surrounding each opening having an integral portion which projects into the box from the surface of the wall to engage the conduit and hold the same in place, substantially as set forth.

2. A box having one or more openings in its walls for a conduit or conduits, the wall of the box surrounding each opening having an integral portion which projects into the box from the surface of the wall and is directed inwardly with respect to the opening for engaging and holding the conduit in place, substantially as set forth.

3. A sheet-metal box having one or more openings in its walls for a conduit or conduits, the wall of the box surrounding each opening having a series of integral teeth which are directed into the box from the surface of the wall and also extend inwardly or toward the center of the opening for engaging and holding the conduit in place, substantially as set forth.

4. The combination of a box having an opening in one of its walls for a conduit, a conduit in said opening, the wall of the box surrounding said opening having one or more integral securing portions which extend into the box from the surface of the wall and engage in the material of the conduit to hold the same in place, substantially as set forth.

5. A metal box having one or more conduit-openings in its walls, the wall of the box surrounding each opening having an integral securing portion for the conduit which projects into the box from the wall at an inclination thereto, and a separated removable plate closing said conduit-opening, substantially as set forth.

6. The combination of a box provided with projecting stationary attaching-ears, an appliance in the box provided with laterally-projecting slotted arms arranged on one side of the attaching-ears, a clamping-slide arranged on the opposite side of each of said attaching-ears, and means connecting each arm and clamping-slide to secure the same to the attaching-ear, substantially as set forth.

7. The combination of a box provided with projecting stationary attaching-ears, an appliance in the box provided with laterally-projecting arms, and clamping-slides for securing said arms to said attaching-ears, the walls of said box having notches opposite to said slides into which the slides are adapted to extend, substantially as set forth.

8. A box for an electrical appliance provided with projecting flat ears, portions of the bodies of which are bent to form guide-flanges, a slide confined by said guide-flanges for the attachment of said appliance, and means for securing said slide on the ear, substantially as set forth.

9. The combination of a box, an appliance in said box provided with a securing portion, an ear on said box, an adjustable slide on said ear, and a fastening device for clamping said adjustable slide and securing portion on opposite sides of said ear, substantially as set forth.

10. The combination of a box provided with an ear, an appliance in said box provided with a securing portion located at one side of said ear, an adjustable slide mounted on the other side of said ear, and a screw for clamping said adjustable slide and securing portion on opposite sides of said ear, substantially as set forth.

11. A box portion having an opening to receive a conduit, the edge of the box portion surrounding the opening having an integral part which projects from the surface of the box portion to engage the conduit and hold the same in place.

Witness my hand this 12th day of August, 1903.

BENJAMIN H. GLOVER.

Witnesses:
CHAS. W. PARKER,
JNO. J. BONNER.